United States Patent [19]

Tanihara et al.

[11] Patent Number: 5,451,421
[45] Date of Patent: Sep. 19, 1995

[54] METHOD FOR PREPARING GRANULAR FOODS

[75] Inventors: Nozomu Tanihara, Chiba; Kazunori Sonobe, Nara; Masanori Hamazaki, Ichihara; Shoji Takata, Hashimoto, all of Japan

[73] Assignee: House Food Industrial Co., Ltd., Higashi-Osaka, Japan

[21] Appl. No.: 139,019

[22] Filed: Oct. 21, 1993

[30] Foreign Application Priority Data

Oct. 21, 1992 [JP] Japan .................. 4-283204

[51] Int. Cl.⁶ .................. A23L 1/00; A23P 1/00
[52] U.S. Cl. .................. 426/589; 426/285; 426/453
[58] Field of Search .............. 426/285, 453, 456, 516, 426/589

[56] References Cited

U.S. PATENT DOCUMENTS

| | | | |
|---|---|---|---|
| 3,987,207 | 10/1976 | Spaeti et al. | 426/285 |
| 4,578,274 | 5/1986 | Sugisawa et al. | 426/589 |
| 5,208,062 | 5/1993 | Sugisawa et al. | 426/589 |

FOREIGN PATENT DOCUMENTS

| | | |
|---|---|---|
| 0052728 | 6/1982 | European Pat. Off. . |
| 0490082 | 6/1992 | European Pat. Off. . |
| 2557772 | 7/1985 | France . |
| 2614765 | 11/1988 | France . |
| 3139920 | 4/1983 | Germany . |
| 58-116652 | 7/1983 | Japan . |
| 59-66848 | 4/1984 | Japan . |
| 2211064 | 6/1989 | United Kingdom . |

OTHER PUBLICATIONS

Patent Abstracts of Japan, vol. 6, No. 118 (C-111), Jul. 2, 1992, JP-A-57047464, Mar. 18, 1982.
Database WPI, Derwent Publications, AN-83-26287K, and Patent Abstracts of Japan, vol. 7, No. 91 (C-162), Apr. 15, 1983, JP-A-58020159, Feb. 5, 1983.

Primary Examiner—George Yeung
Attorney, Agent, or Firm—Oblon, Spivak, McClelland, Maier & Neustadt

[57] ABSTRACT

A method for preparing a granular food comprises the steps of mixing a material to be granulated with oil and fat having an open-tubed melting point ranging from 40° to 55° C. under heating without addition of water, then subjecting the mixture to granulation through extrusion and rapidly cooling the granulated product. The method permits the dry granulation of foods without addition of water and efficient preparation of granular foods which do not require any process for adjusting particle size distribution of the resulting foods after granulation and which permits the production of granular foods having appropriate strength.

29 Claims, No Drawings

METHOD FOR PREPARING GRANULAR FOODS

BACKGROUND OF THE INVENTION

The present invention relates to a method for granulating a food, for instance, a raw material for food or a food composition such as curry (or curry roux), stew, soup, sauce, a variety of seasonings and a variety of spices.

Methods for granulating foods without using any water are disclosed in, for instance, Japanese Un-examined Patent Publication (hereunder referred to as "J.P. KOKAI") Nos. Sho 58-116652 and Sho 59-66848. More specifically, J.P. KOKAI No. Sho 58-116652 relates to a novel method for preparing oil and fat-containing granular seasonings which can be stored at ordinary temperature over a long period of time by substantial inhibition of the oxidation of the oil and fat present therein, which comprises the steps of mixing a heated liquid of solid oil and fat, which have an open-tubed melting point ranging from about 30° to 45° C., preferably about 35° to 38° C. and are heated into the molten state, with a mixed powdery seasoning which is preferably warmed, in advance, with stirring; cooling the resulting mixture down to a temperature of about 10° to 15° C. to thus solidify the oil and fat components and then granulating the solidified mixture by a means such as grinding or crushing. On the other hand, J. P. KOKAI No. Sho 59-66848 relates to a novel dry-granulation method which comprises mixing, in a powdery condition, a powdery material to be granulated with a powdery binder having an open-tubed melting point ranging from 40° to 130° C., then heating the resulting powdery mixture at a temperature of not less than the open-tubed melting point of the powdery binder and subsequently cooling the processed and heated mixture down to a temperature of not more than the open-tubed melting point of the binder.

However, the foregoing methods provide granular materials whose particle size distribution is wider than that observed on granules prepared by granulation through extrusion and the methods may often require a process for adjusting the particle size of the resulting granular products. Moreover, the granules prepared by these methods are weakly associated as compared with those prepared by granulation through extrusion and thus the granules are easily destroyed even by an accidental weak external shock.

On the other hand, a method for granulating foods through extrusion is a kind of wet-method as disclosed in, for instance, Japanese Examined Patent Publication (hereunder referred to as "J.P. KOKOKU") No. Sho 53-45380. The method of this type comprises water addition-granulation-hot air drying processes, can provide granules having a narrow particle size distribution and does not require any process for adjusting particle size. However, the method requires water-addition and drying processes and this results in poor operating efficiency. Moreover, the drying process leads to disappearance of desired smells of foods and deteriorates the taste thereof.

SUMMARY OF THE INVENTION

Accordingly, an object of the present invention is to provide a novel method for dry granulation of foods without addition of water and more particularly to a method for efficiently preparing granular foods, which does not require any process for adjusting particle size distribution after granulation and which permits the production of granular foods having appropriate strength.

This and other objects of the present invention will be apparent from the following description and Examples.

The present invention has been completed on the basis of the finding that if a material to be granulated is processed by mixing, under heating, the material with oil and fat having a specific open-tubed melting points, then granulating the mixture through extrusion and rapidly cooling the extruded mixture, the resulting granular material does not require any process for adjusting particle size distribution after granulation unlike the conventional methods and the resulting granules have high strength.

According to an aspect of the present invention, there is provided a method for preparing a granular food which comprises mixing, under heating, a food to be granulated with oil and fat having an open-tubed melting point ranging from 40° to 55° without addition of water, then granulating the resulting mixture through extrusion and rapidly cooling the granulated mixture.

According to another aspect of the present invention there is provided a method for preparing a granular food which comprises the steps of mixing a material to be granulated with oil and fat having an open-tubed melting point ranging from 40° to 55° under heating without addition of water, then subjecting the mixture to granulation through extrusion, rapidly cooling the granulated product, deviding the rapidly cooled product in portions of predetermined amounts, heating it to agglomerate the granulated product and then again cooling the agglomerates.

DESCRIPTION OF THE PREFERRED EMBODIMENTS

The method according to the present invention can be applied to granulation of a food, for instance, a raw material for food and a food composition such as curry (or curry roux), stew, soup, sauce, a variety of seasonings and a variety of spices. Examples of these raw materials usable in the present invention are powdery or particulate materials, in particular those having particle sizes of not more than 1,000 μ. In addition, the method of the present invention is preferably applied to foods comprising wheat flour as an ingredient thereof.

The oil and fat usable in the present invention are not restricted to specific ones inasmuch as they have open-tubed melting points ranging from 40° to 55° C. This is because if the open-tubed melting point thereof is less than the lower limit, the resulting granular foods and/or raw materials for foods cannot hold the granular states when they are under shipment or stored in environments having relatively high temperatures such as those encountered in summer. On the other hand, if the open-tubed melting point thereof exceeds the upper limit defined above, the taste and texture, upon eating, of these granular foods and the foods obtained from these raw materials are adversely affected. For instance, one would feel rough to the tongue upon eating them and the foods have unsatisfactory flavors. The oil and fat preferably have open-tubed melting points ranging from 46° to 53° C.

In the method of the present invention, materials to be granulated such as raw materials for food and food compositions are first admixed with oil and fat under heating. The amount of the oil and fat to be added ranges from 5 to 18% by weight and preferably 7.5 to 15% by weight, with the balance being the material to be granulated such as those listed above. If the oil and fat are used in an amount falling within the range defined above, the resulting mixture can easily be granulated and the food ultimately obtained exhibits good taste and texture free of stickiness and roughness upon eating it and comprises granules having relatively high strength.

When the material to be granulated comprises at least two combined powdery raw materials, it is preferred to previously mixing these raw materials in the powdery state and then mixing the material with oil and fat. Moreover, oil and fat are preferably converted into a liquid state, in advance, through heating to simplify the mixing operation thereof with the material to be granulated.

The foregoing mixing step may be performed by mixing, at a time, all of the raw materials constituting the material to be granulated and oil and fat, but preferably performed by first premixing a part of the raw materials constituting the material to be granulated (e.g., wheat flour) with oil and fat with heating, then adding the remaining raw materials to the premixture and mixing them under heating.

When foods comprising a large amount of starch materials such as roux for curry and stew are granulated by a wet-method, the granulation in general requires the use of a large amount of oil and fat for the improvement of the granulating properties of the foods. According to the present invention, however, the oil and fat having a specific open-tubed melting point are used. The use of such oil and fat permits not only the improvement of the granulating properties of such foods, but also the reduction of the amount of the oil and fat required for the improvement of the properties. The required amount of the oil and fat is about 30% smaller than that required for the conventional wet-methods.

The conditions for heating during mixing these ingredients vary depending on the kinds of the material to be granulated, but the heating operation is in general carried out at a temperature of not less than the open-tubed melting point of the oil and fat used. In addition, the material to be granulated comprising ingredients which require cooking through heating is heat treated under conditions adapted for cooking these ingredients. The conditions for heating also vary depending on the overall amount of the material to be granulated, but are in general a temperature ranging from 80° to 120° C. and a heating time ranging from 5 to 40 minutes.

According to the present invention, the foregoing material to be granulated which has been mixed under heating is treated in an extrusion granulator at the mixing temperature without cooling; or is cooled down to a temperature of about 60° C., preferably on the order of 50° to 60° C. and then treated in an extrusion granulator at that temperature. In this respect, the material obtained after the heating and mixing processes and having a temperature ranging from 100° to 130° C. can be cooled down to a level on the order of 50° to 60° C. in accordance with a known method such as those which make use of a twin-screw extruder or a fluidized bed cooling device.

In the present invention, any known extrusion granulator may be used, but preferred are double-screw type ones from the viewpoint of high production capacity and operation efficiency thereof. Moreover, the granulation is preferably carried out while the temperature of the granulator is set to a level such that the granulated product discharged from the granulator is maintained at 50° to 60° C.

According to the method of the present invention, the granulated product was rapidly cooled to a desired temperature level immediately after it is discharged from the granulator. This rapid cooling can be carried out by, for instance, (i) a method comprising rapid cooling through blowing a cold gas such as cooled carbon dioxide or nitrogen gas on the granulated product, (ii) a method comprising blowing cold air on a fluidized bed of the granulated product and (iii) a method comprising dropping the granulated product on a floor previously cooled to a desired temperature through the use of dry ice or cold carbon dioxide gas while moving the granulated product on the floor, with the foregoing method (iii) being preferred. Thus, the oil and fat included in the granulated product are rapidly cooled to the solidifying temperature thereof and as a result, they do not get cloudy. The rapid cooling is, for instance, performed in such a manner that a material having a temperature ranging from 50° to 60° C. is cooled down to 10° C. within 10 minutes, preferably 1 to 5 minutes.

Thus, the method of the present invention permits the production of a granulated food having an average particle size ranging from 0.3 to 3 mm.

In the present invention, the granulated product thus prepared is formed into agglomerates having a large particle size by dividing the granules into portions of predetermined amounts and heating them to associate them through fusion-bonding of the oil and fat. More specifically, the granulated product is distributed in each container in a predetermined amount (or volume) and then the container is warmed at a temperature around the open-tubed melting point of the oil and fat (for instance, ranging from the open-tubed melting point of the oil and fat to a temperature 20° C. higher than the open-tubed melting point) to melt a part of the oil and fat in each granule and to thus agglomerate the granules (this phenomenon is generally called "cakings"). The foregoing warming treatment is preferably carried out by a mild heating means such as a means for passing or circulating warmed water around the container and may be performed while the contents of the container is agitated. Thereafter, the contents of the container is cooled down to a temperature of not more than the open-tubed melting point of the oil and fat, preferably 10° to 25° C. to give agglomerates. The size of the agglomerate may arbitrarily be controlled by, for instance, properly selecting the size of the container. In this respect, the contents of the container can easily be cooled by, for instance, substituting cold water for the warmed water circulated around the container during the warming step.

According to the present invention, (i) water is not used, accordingly the method does not require any drying process and thus the production process can be made simple; (ii) a high content of starch ingredients in the material to be granulated requires the use of a large amount of oil and fat and this adversely affects the taste and texture of the resulting granulated product, but the present invention permits effective solution of this problem since the method permits granulation even if the amount of oil and fat is low; (iii) the rapid cooling process can prevent the oil and fat from getting cloudy, thus permits the production of granular foods or raw materials for foods having good appearance, and the usage thereof can be made convenient if the granulated product is distributed in containers in a predetermined amount to agglomerate the same. Moreover, the granulated product is agglomerated by adhesion of granules through fusion-bonding of the oil and fat. Therefore, the association thereof is not so strong and the agglomerates are excellent in solubility in (hot) water.

Since the granulated foods prepared by the method of the present invention have excellent properties discussed above, the shapes of the particles can be maintained during transportation and storage. Moreover, curry and stew can easily be prepared by dissolving roux for stew and curry preparesd according to the method of the present invention in, for instance, hot water since they have good solubility.

The method of the present invention will hereunder be explained in more detail with reference to the following working Examples.

EXAMPLE 1 (Cream Stew)

In a container for mixing provided with a stirring machine, there were admixed 30 parts by weight of wheat flour and 15 parts by weight of hardened palm oil having an open-tubed melting point of 48° C. (corresponding to 15% by weight on the basis of the total weight of the material to be granulated) while heating the container in such a manner that the temperature of the mixture was maintained at 120° C. Thereafter, there were added, to the resulting mixture, 17 parts by weight of starch, 9 parts by weight of sugar, 8 parts by weight of common salt, 6 parts by weight of cornstarch, 5 parts by weight of powdered milk and 10 parts by weight of other seasonings, followed by mixing these ingredients while heating in such a manner that the temperature of these mixed ingredients was maintained at 95° C. The mixture was cooled down to about 60° C. and then granulated in an extrusion granulator (egg pelleter, available from Fuji Powdal Co., Ltd.; pore diameter of the screen: 1.2 mm). The granulated product maintained at 60° C. was rapidly cooled down to about 20° C. within one minute by bringing the product into contact with dry ice (0.3 kg per 1 kg of the granulated product) immediately after being discharged from the granulator without subjecting it to any drying process to give a granular cream stew product (particle size: 1.2 mm).

The resulting granular cream stew had excellent taste and texture and good appearance, the granules had appropriate strength and was excellent in solubility in (hot) water.

EXAMPLE 2 (Curry)

In a container for mixing provided with a stirring machine, there were admixed 26 parts by weight of wheat flour and 10 parts by weight of hardened palm oil having an open-tubed melting point of 50° C. (corresponding to 10% by weight on the basis of the total weight of the material to be granulated) while heating the container in such a manner that the temperature of the mixture was maintained at 120° C. Thereafter, there were added, to the resulting mixture, 13 parts by weight of sugar, 13 parts by weight of common salt, 11 parts by weight of cornstarch, 10 parts by weight of powdered curry, 2 parts by weight of powdered milk and 15 parts by weight of other seasonings, followed by mixing these ingredients while heating in such a manner that the temperature of these mixed ingredients was maintained at 106° C. The mixture was cooled down to about 60° C. and then granulated in an extrusion granulator identical to that used in Example 1. The granulated product maintained at 60° C. was rapidly cooled down to about 20° C. within one minute by bringing the product into contact with dry ice (0.3 kg per 1 kg of the granulated product) immediately after being discharged from the granulator without subjecting it to any drying process to give a granular curry roux product (particle size: 1.2 mm).

The resulting granular curry roux had excellent taste and texture and good appearance, the granules had appropriate strength and was excellent in solubility in (hot) water.

EXAMPLE 3 (Cream Stew)

The same procedures used in Example 1 were repeated except that the cooling of the resulting granulated product was performed in a fluidized bed cooling device under the conditions of a cooling air temperature of $-10°$ C., a flow rate of the cooling air of 12 m³/min and a retention time in the device of about 10 min to give granular roux for cream stew.

EXAMPLE 4 (Cream Stew)

An amount of 0.12 kg of the granular cream stew prepared in Example 1 was packed in a molding container (8 cm×14 cm×3 cm) of cardboard, allowed to stand in a temperature controlled bath maintained at 55° C. for 12 hours and then returned to room temperature to give agglomerated roux for cream stew. In these agglomerates, the cream stew granules were fusion-bonded together in such a manner that they were easily destroyed through the application of a slightly high external force.

What is claimed is:

1. A method for preparing a granular food comprising the steps of:
   mixing a raw food material to be granulated with oil and fat, wherein said oil and fat have an open-tubed melting point ranging from 40° to 55° C., under heating without addition of water to form a mixture;
   cooling the mixture to a temperature ranging from 50° to 60° C.;
   subjecting the cooled mixture to granulation through extrusion to form a granulated product; and,
   rapidly cooling the granulated product to a temperature sufficient to solidify said oil and fat within 10 minutes.

2. The method of claim 1 wherein the added amount of the oil and fat ranges from 5 to 18% by weight.

3. The method of claim 1 wherein the open-tubed melting point of the oil and fat ranges from 46° to 53° C.

4. The method of claim 1 wherein said raw food material to be granulated comprises wheat flour.

5. The method of claim 1 wherein the heating is carried out at a temperature of 80° to 120° C. for 5 to 40 minutes.

6. The method of claim 1 wherein the granulated product has a temperature of 50° to 60° C. after being dischared from the extrusion.

7. The method of claim 1 wherein the granulated product is rapidly cooled by blowing a cold gas on the product; by blowing cold air on a fluidized bed of the product; or by dropping the product on a floor previously cooled to a desired temperature through the use of dry ice or cold carbon dioxide gas while moving the product on the floor.

8. The method of claim 7 wherein the rapid cooling is carried out by blowing a fluidized bed of the granulated product with cold air.

9. The method of claim 7 wherein the rapid cooling is carried out by cooling the granulated product having a temperature ranging from 50° to 60° C. down to 10° C. within 10 minutes.

10. The method of claim 1 wherein the oil and fat to be mixed with said raw food material is in the heated liquid state.

11. The method of claim 4 wherein the oil and fat is firstly mixed with wheat flour under heating and further mixed with a material other than wheat flour under heating.

12. The method according to claim 1, wherein said rapidly cooling step cools said granulated product having a temperature of from 50°–60° C. to 20° C. within 10 minutes.

13. The method according to claim 7 wherein said rapidly cooling step cools said granulated product having a temperature of from 50°–60° C. to 20° C. within 10 minutes.

14. The method according to claim 7, wherein said rapidly cooling step cools said granulated product having a temperature of from 50°–60° C. to 10° C. within 1–5 minutes.

15. A method for preparing a granular food comprising the steps of:
    mixing a raw food material to be granulated with oil and fat, wherein said oil and fat have an open-tubed melting point ranging from 40° to 55° C., under heating without addition of water to form a mixture;
    subjecting the mixture to granulation through extrusion to form a granulated product;
    rapidly cooling the granulated product to a temperature sufficient to solidify said oil and fat:
    dividing the rapidly cooled product into portions of predetermined amounts;
    warming said portions to a temperature such that said granulated product agglomerates; and,
    cooling the warmed portions to give agglomerates.

16. The method of claim 15 wherein the cooled granular product is warmed at a temperature ranging from the open-tubed melting point of the oil and fat to a temperature 20° C. higher than the open-tubed melting point.

17. The method of claim 15 wherein said portions are placed into containers and said warming is performed by circulating warmed water around said containers.

18. The method of claim 15 wherein the oil and fat to be mixed with said raw food material is in the heated liquid state.

19. The method of claim 15 wherein the added amount of the oil and fat ranges from 5 to 18% by weight.

20. The method of claim 15 wherein the open-tubed melting point of the oil and fat ranges from 46° to 53° C.

21. The method of claim 15 wherein said raw food material to be granulated comprises wheat flour.

22. The method of claim 21 wherein the oil and fat is firstly mixed with wheat flour under heating and further mixed with a material other than wheat flour under heating.

23. The method according to claim 15, wherein the granulated product is rapidly cooled by blowing a cold gas on the product.

24. The method according to claim 15, wherein the granulated product is rapidly cooled by blowing cold air on a fluidized bed of the product.

25. The method according to claim 15, wherein the granulated product is rapidly cooled by dropping the product on a floor previously cooled to a desired temperature through the use of dry ice or cold carbon dioxide gas while moving the product on the floor.

26. The method according to claim 15, wherein said rapidly cooling step cools said granulated product having a temperature of from 50°–60° C. to 10° C. within 10 minutes.

27. The method according to claim 15, wherein said rapidly cooling step cools said granulated product having a temperature of from 50°–60° C. to 10° C. within 1–5 minutes.

28. The method according to claim 15, wherein said cooling the warmed portions step cools the warmed portions to a temperature of from 10°–25° C.

29. The method according to claim 15, wherein said rapidly cooling step cools said granulated product having a temperature of from 50°–60° C. to 20° C. within 10 minutes.

* * * * *